(12) United States Patent
Ishii et al.

(10) Patent No.: US 8,368,027 B2
(45) Date of Patent: Feb. 5, 2013

(54) RADIATION DETECTION APPARATUS AND RADIOGRAPHIC IMAGING SYSTEM

(75) Inventors: Takamasa Ishii, Honjo (JP); Chiori Mochizuki, Sagamihara (JP); Minoru Watanabe, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 876 days.

(21) Appl. No.: 12/493,776

(22) Filed: Jun. 29, 2009

(65) Prior Publication Data
US 2010/0001194 A1     Jan. 7, 2010

(30) Foreign Application Priority Data

Jul. 1, 2008   (JP) .................................. 2008-172622
Jun. 5, 2009   (JP) .................................. 2009-136710

(51) Int. Cl.
*G01T 1/24* (2006.01)
(52) U.S. Cl. ......... 250/370.08; 250/370.01; 250/370.11; 250/366; 250/370.14
(58) Field of Classification Search .............. 250/370.14
See application file for complete search history.

(56) References Cited

U.S. PATENT DOCUMENTS

| | | | |
|---|---|---|---|
| 5,641,974 A * | 6/1997 | den Boer et al. ................. | 257/59 |
| 5,693,947 A * | 12/1997 | Morton ..................... | 250/370.09 |
| 5,770,871 A * | 6/1998 | Weisfield ...................... | 257/232 |
| 5,780,871 A * | 7/1998 | den Boer et al. ................. | 257/59 |
| 5,920,084 A * | 7/1999 | Gu et al. .......................... | 257/59 |
| 6,011,274 A * | 1/2000 | Gu et al. .......................... | 257/59 |
| 6,034,725 A | 3/2000 | Franklin et al. ................ | 348/310 |
| 6,124,606 A * | 9/2000 | den Boer et al. ............... | 257/291 |
| 6,515,286 B2 * | 2/2003 | Kuwabara ................. | 250/370.11 |
| 6,849,853 B2 * | 2/2005 | Ikeda et al. ................ | 250/370.09 |
| 7,205,547 B2 | 4/2007 | Ishii et al. ................. | 250/370.09 |
| 7,435,968 B2 | 10/2008 | Watanabe et al. ......... | 250/370.14 |
| 7,470,908 B2 | 12/2008 | Ishii et al. ................. | 250/370.08 |
| 7,535,506 B2 | 5/2009 | Nomura et al. ............... | 348/308 |
| 7,855,371 B2 * | 12/2010 | Okada ....................... | 250/370.09 |
| 2001/0038076 A1 * | 11/2001 | Kuwabara ................. | 250/370.11 |
| 2002/0079493 A1 * | 6/2002 | Morishita ......................... | 257/72 |
| 2004/0065840 A1 * | 4/2004 | Morishita ................ | 250/370.11 |
| 2005/0116240 A1 * | 6/2005 | Kim et al. ......................... | 257/88 |

(Continued)

FOREIGN PATENT DOCUMENTS

| | | |
|---|---|---|
| JP | 10-123253 | 5/1998 |
| JP | 10-511817 | 11/1998 |
| WO | WO 97/14186 | 4/1997 |

*Primary Examiner* — David Porta
*Assistant Examiner* — Djura Malevic
(74) *Attorney, Agent, or Firm* — Fitzpatrick, Cella, Harper & Scinto

(57) ABSTRACT

A radiation detection apparatus comprises a plurality of pixels each including a conversion element which converts incident radiation into a charge, a switching element which transfers the charge, and an interlayer insulation film disposed between the conversion element and the switching element, a gate line to drive the switching element, and a signal line located to intersect with the gate line and configured to read out the charge transferred from the switching element, wherein $Ca \geq \in_0 \times \in \times S/d$ and $7d \leq P/2$ is satisfied, where P is a pixel pitch, Ca is a sum total of coupling capacitances between the signal line and the gate line, S is an overlapping area of the signal line and the conversion element, d is a thickness of the interlayer insulation film, $\in$ is a relative dielectric constant of the interlayer insulation film, and $\in_0$ is a vacuum dielectric constant.

7 Claims, 13 Drawing Sheets

U.S. PATENT DOCUMENTS

| | | | |
|---|---|---|---|
| 2005/0179849 A1* | 8/2005 | Nomura et al. | 349/149 |
| 2009/0004768 A1 | 1/2009 | Watanabe et al. | 438/64 |
| 2009/0008533 A1 | 1/2009 | Ishii et al. | 250/208.1 |
| 2009/0040310 A1 | 2/2009 | Nomura et al. | 348/162 |
| 2009/0040348 A1 | 2/2009 | Ishii et al. | 348/294 |
| 2009/0283689 A1* | 11/2009 | Mochizuki et al. | 250/370.14 |

\* cited by examiner

RADIATION DETECTION APPARATUS AND RADIOGRAPHIC IMAGING SYSTEM

BACKGROUND OF THE INVENTION

1. Field of the Invention

The present invention relates to a radiation detection apparatus and radiographic imaging system which can be used in, for example, a medial image diagnostic apparatus, a nondestructive inspection apparatus, and an analysis apparatus using radiation.

2. Description of the Related Art

In recent years, as a technique for manufacturing a liquid crystal display panel using a thin-film transistor (TFT) makes advance, the sizes of both the panel and the screen of its display unit increase. This manufacturing technique is applied to a wide area sensor including a photoelectric conversion element or a direct conversion element which directly converts radiation such as X-rays into a charge, and a switching element such as a TFT. An area sensor including a photoelectric conversion element is often used in the field of radiation detection apparatuses such as a medical X-ray detection apparatus in combination with a scintillator which converts radiation such as X-rays into light such as visible light.

The pixel structures of the radiation detection apparatuses are generally classified into two types: a planar type in which a conversion element and a switching element are located on the same plane, and a stacked type in which a conversion element is located above a switching element. The former pixel structure can simplify the manufacturing process because this structure can be obtained by forming a conversion element and a switching element in the same semiconductor manufacturing process.

In contrast to this, the latter pixel structure can include a conversion element formed to have an area per pixel larger than that in the planar type because this structure is obtained by locating the conversion element above a switching element. This allows the radiation detection apparatus to obtain a large signal and therefore to have a high S/N ratio, that is, high sensitivity. Japanese Patent Laid-Open No. 10-123253 and 10-511817 describe details of radiation detection apparatuses of the stacked type as mentioned above.

In a radiation detection apparatus, as the parasitic capacitance of a signal line increases, the amount of noise, in turn, increases. Under the circumstance, to improve the sensitivity of even a radiation detection apparatus of the stacked type, it is important not only to improve its numerical aperture but also to reduce noise, that is, reduce the capacitance added to a signal line. To attain this, the interlayer insulation film is desirably thick. Japanese Patent Laid-Open No. 10-123253 and PCT(WO) 10-511817 describe details of an interlayer insulation film having a large thickness.

On the other hand, from the viewpoint of ensuring a given coverage of the sensor film, the height of a contact hole to connect the conversion element and the switching element is preferably low, that is, the thickness of the interlayer insulation film is preferably small. In addition, to leave a sufficient margin in the layout of each element and interconnection, both the thickness of the interlayer insulation film and the hole diameter are desirably small. However, in such an arrangement, the image obtained when the interlayer insulation film has a thickness as small as, for example, 500 nm is more likely to have unevenness, which deteriorates its quality, than that obtained when the interlayer insulation film has a large thickness.

SUMMARY OF THE INVENTION

The present invention provides a radiation detection apparatus which can reduce unevenness of an image attributed to the thickness distribution of an interlayer insulation film, and obtain a satisfactory image by stabilizing the characteristic of a sensor element on the interlayer insulation film.

One of the aspects of the present invention provides a radiation detection apparatus comprising a plurality of pixels each including a conversion element which converts incident radiation into a charge, a switching element which transfers the charge of the conversion element, and an interlayer insulation film disposed between the conversion element and the switching element, a gate line to drive the switching element, and a signal line which is located to intersect with the gate line and configured to read out the charge transferred from the switching element, wherein $Ca \geq \epsilon_0 \times \epsilon \times S/d$ and $7d \leq P/2$ is satisfied, where P is a pixel pitch of the plurality of pixels, Ca is a sum total of coupling capacitances between the signal line and the gate line in one pixel, S is an overlapping area of the signal line and the conversion element in one pixel, d is a thickness of the interlayer insulation film, $\epsilon$ is a relative dielectric constant of the interlayer insulation film, and $\epsilon_0$ is a vacuum dielectric constant.

Further features of the present invention will become apparent from the following description of exemplary embodiments with reference to the attached drawings.

DESCRIPTION OF THE EMBODIMENTS

The inventors of the present invention examined the cause of unevenness of an image, which deteriorates its quality and often appears when the interlayer insulation film has a thickness as small as, for example, 500 nm, and concluded that it is accounted for by the fact that the distribution of the capacitance added to a signal line largely changes depending on the thickness distribution of the interlayer insulation film. They also speculated that instability in the characteristic of the sensor element when the interlayer insulation film is thick is accounted for by the factors associated with the coverage of the sensor film.

Best modes for carrying out the invention will be described in detail below with reference to the accompanying drawings. In this specification, radiation means energy which includes particle beams such as visible light, infrared rays, X-rays, γ-rays, α-rays, or β-rays. Also, a conversion element means a semiconductor element which converts at least one of an optical signal and X-rays, γ-rays, α-rays, or β-rays of radiation into an electrical signal.

First Embodiment

Figure 1:
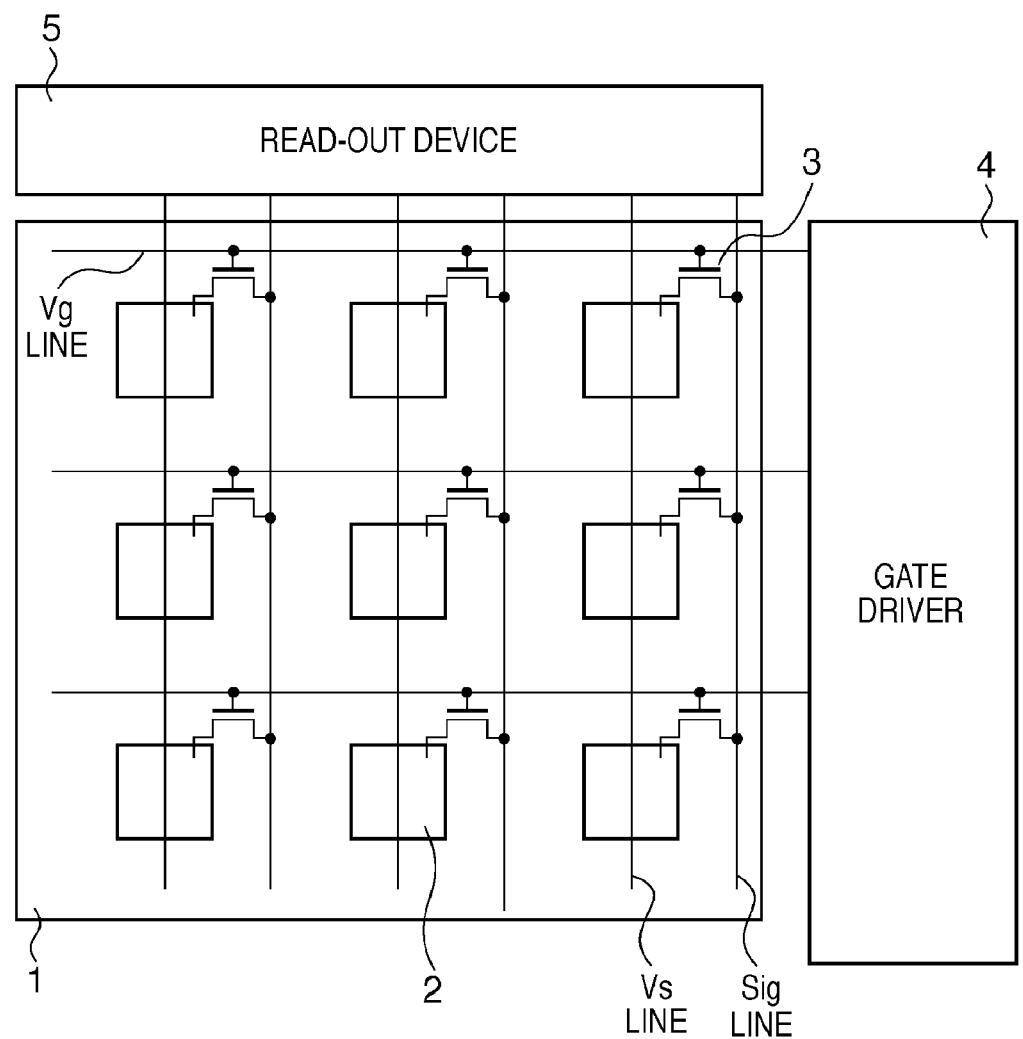
FIG. 1 is a circuit diagram showing the circuitry of a radiation detection apparatus according to the first embodiment of the present invention.
Figure 2:
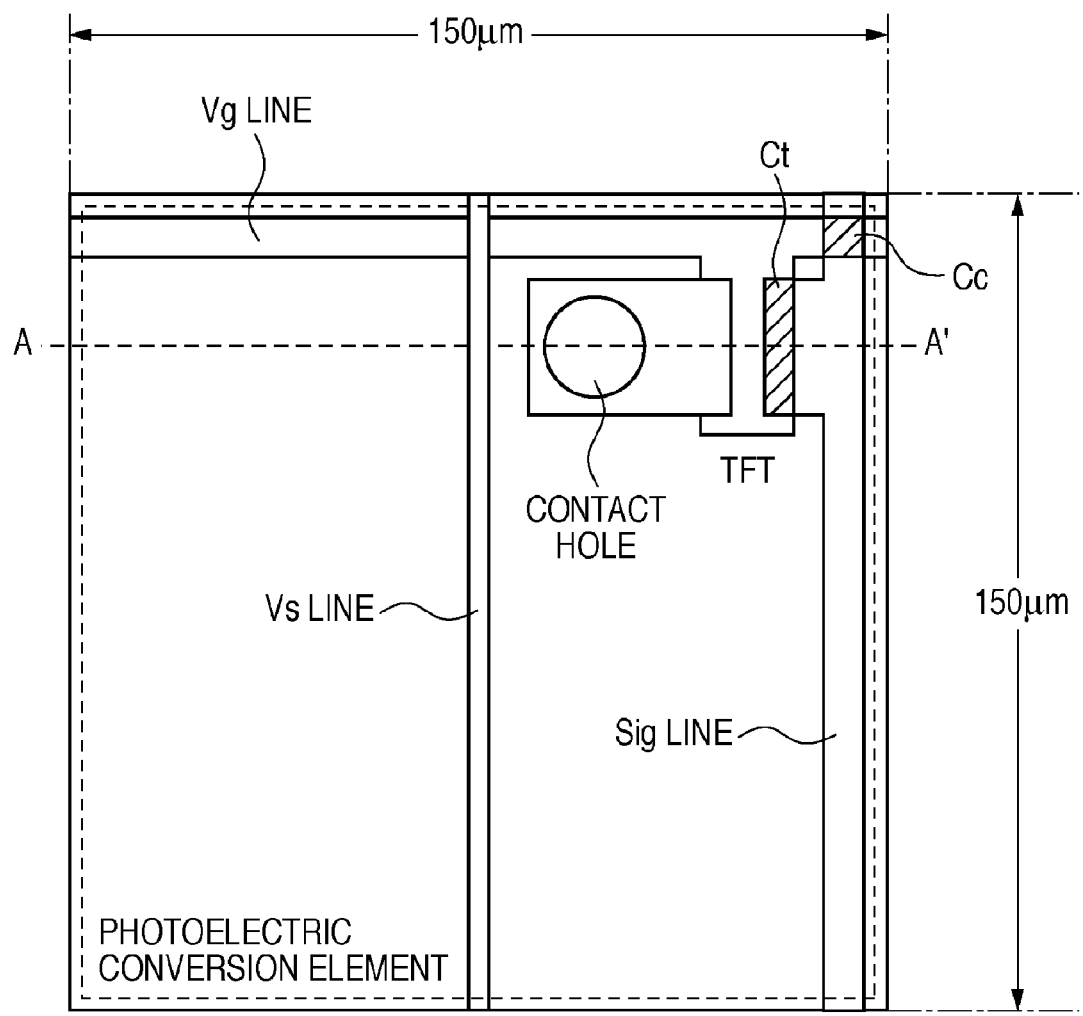
FIG. 2 is a plan view showing one pixel of the radiation detection apparatus shown in FIG. 1.
Figure 3:
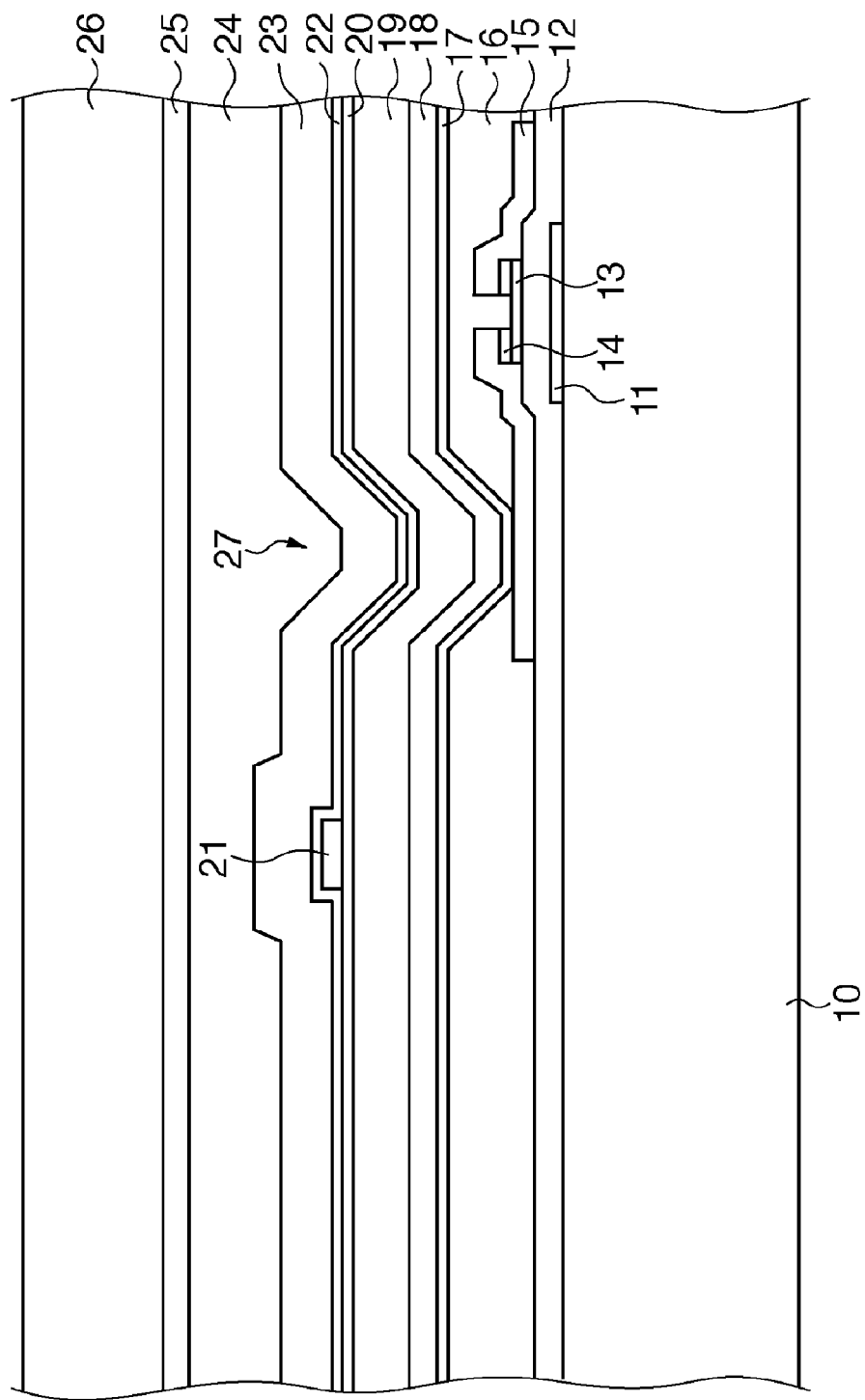
FIG. 3 is a sectional view taken along a line A-A' in FIG. 2.
Figure 4:
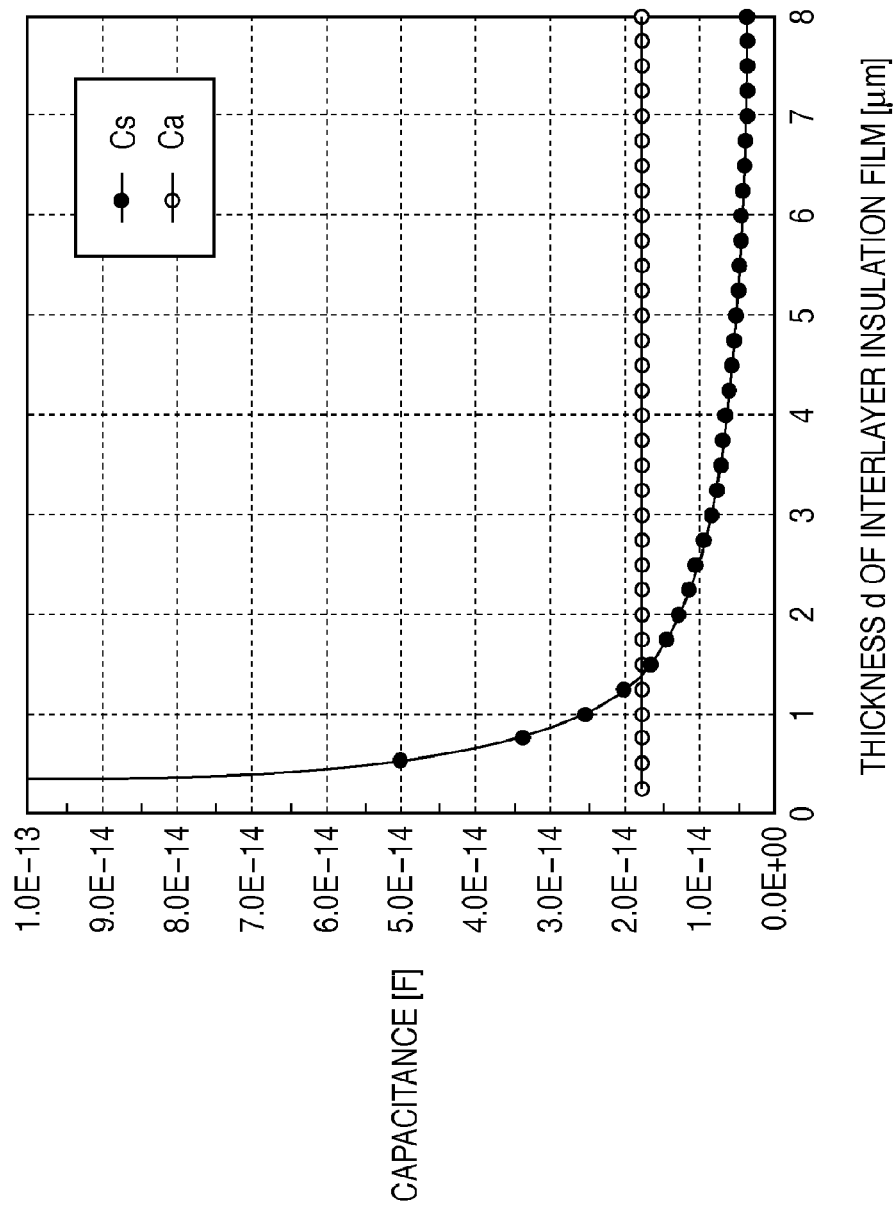
FIG. 4 is a correlation graph showing the relationships between the thickness of an interlayer insulation film and the capacitances added to a signal line in the first embodiment.
Figure 5:
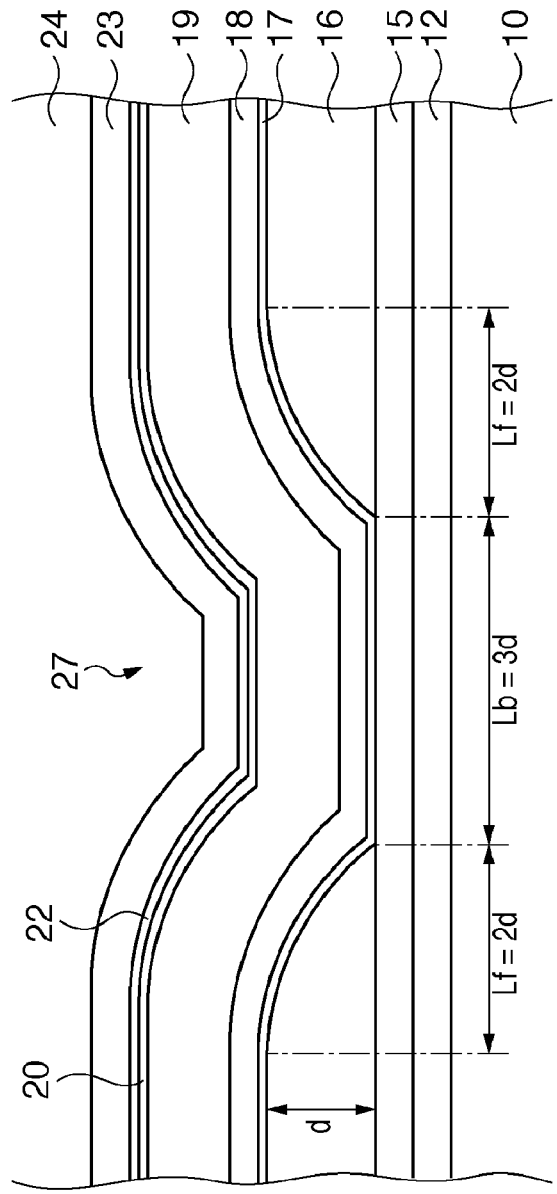
FIG. 5 is a sectional view showing details of a contact hole in the first embodiment.

FIG. 1 is a circuit diagram showing the circuitry of a radiation detection apparatus according to the first embodiment of the present invention. FIG. 2 is a plan view showing one pixel. FIG. 3 is a sectional view taken along a line A-A' in FIG. 2. FIG. 4 is a correlation graph showing the relationships between the thickness of an interlayer insulation film and the capacitances added to a signal line. FIG. 5 is a sectional view showing a contact hole to connect a conversion element and a switching element.

As shown in FIG. 1, a plurality of pixels each including a conversion element 2 and switching element 3 are arrayed in a matrix in a radiation detection panel 1 serving as a radiation detection apparatus. An MIS type photoelectric conversion element, for example, is used as the conversion element 2. The switching element 3 is a signal transfer switching element which transfers the signal from the conversion element 2. The gate of the switching element 3 is connected to a gate line (Vg line) and driven by the signal from a gate driver 4. A TFT having a drain, source, and gate is used as the switching element 3.

The signal transfer switching element 3 has one terminal (a drain or source) connected to a signal line (Sig line). The signal from the conversion element 2 is transferred to the signal line (Sig line) by the switching element 3 and read out by a read-out device 5. The read-out device 5 applies a bias voltage to the conversion element 2 via a bias line (Vs line).

The operation principle according to this embodiment will be explained below with reference to FIG. 1. First, a bias is applied from the read-out device 5 to the bias line (Vs line) so as to deplete a photoelectric conversion layer of the MIS type photoelectric conversion element serving as the conversion element 2. For example, a reference potential (GND) and a voltage of 10 V are applied to the signal line (Sig line) and the bias line (Vs line), respectively.

In this state, X-rays emitted toward a subject (not shown) are attenuated by and transmitted through the subject and converted into visible light by a scintillator layer (not shown). The obtained visible light enters the conversion element 2 in the radiation detection panel 1 and is converted into a charge by the conversion element 2. That is, the conversion element 2 converts the incident radiation into a charge. The obtained charge is transferred to the signal line (Sig line) via the switching element 3 by a gate driving pulse applied from the gate driver 4 to the gate line (Vg line), and is read out to the outside by the read-out device 5. Note that X-rays are used as the radiation for the radiation detection apparatus. The same applies to the following embodiments.

After that, any residual charge which has been generated in the conversion element 2 but remains without being transferred by the switching element 3 is removed by exploiting a change in the potential of the Vs line. At this time, the potential of the Vs line changes, for example, from 10 V to −5 V. A TFT may be used to remove any residual charge.

The arrangement of one pixel will be explained with reference to FIG. 2. A photoelectric conversion element serving as the conversion element 2, and a TFT serving as the switching element 3 are arranged in one pixel of the radiation detection panel 1. Also, an Sig line, a Vg line, and a Vs line are formed in the pixel. FIG. 2 shows an example in which the pixel pitch is 150 µm. Capacitances Cc and Ct will be described later.

The layer structure of the radiation detection panel 1 will be explained with reference to FIG. 3. FIG. 3 is a sectional view taken along a line A-A' in FIG. 2. Referring to FIG. 3, reference numeral 10 denotes an insulating substrate. A TFT serving as the signal transfer switching element 3 includes a first conductive layer 11, first insulation layer 12, first semiconductor layer 13, first impurity semiconductor layer 14, and second conductive layer 15 formed on the insulating substrate 10. The first impurity semiconductor layer 14 is an n-type semiconductor layer.

The first conductive layer 11 is used as the gate line (Vg line) and the gate electrode of the switching element 3, and the first insulation layer 12 is used as a gate insulation film of the switching element 3. The first semiconductor layer 13 is used as the channel of the switching element 3, and the first impurity semiconductor layer 14 is used as an ohmic contact layer. The second conductive layer 15 is used as the signal line (Sig line) and the source or drain electrode of the switching element 3. The signal line (Sig line) intersects with the gate line (Vg line). In other words, the signal line (Sig line) and the gate line (Vg line) partially overlap each other.

An interlayer insulation film 16 is formed on the second conductive layer 15, and an MIS type photoelectric conversion element which constitutes the conversion element 2 is stacked on the interlayer insulation film 16. That is, an interlayer insulation film 16 is disposed between the switching element 3 and the conversion element 2. The conversion element 2 includes a third conductive layer 17, second insulation layer 18, and second semiconductor layer (photoelectric conversion layer) 19. The conversion element 2 also includes a second impurity semiconductor layer 20, fourth conductive layer 21, and fifth conductive layer 22. An n-type conductive semiconductor layer is used as the second impurity semiconductor layer 20.

The third conductive layer 17 is used as the lower electrode of the conversion element 2, and the second insulation layer 18 is used as the insulation layer of the conversion element 2. The second semiconductor layer 19 is used as the photoelectric conversion layer of the conversion element 2, and the second impurity semiconductor layer 20 is used as the hole blocking layer of the conversion element 2. The fourth conductive layer 21 is used as the bias line (Vs line) or the upper electrode of the conversion element 2, and the fifth conductive layer 22 is used as an electrode for applying a bias voltage supplied from the bias line (Vs line) to the entire conversion element 2.

A third insulation layer 23, a protective layer 24, an adhesive layer 25, and a scintillator layer (phosphor layer) 26 for converting X-rays into visible light by wavelength conversion are sequentially formed on the fifth conductive layer 22. A contact hole 27 connects the conversion element 2 and the switching element 3. The contact hole 27 will be described later.

The causes for unevenness of an image generated in the conventional radiation detection apparatus will be explained hereinafter. Let Ca be the sum total of the coupling capacitances between the Sig line (second conductive layer 15) and the first conductive layer 11 which intersects with it in one pixel, as shown in FIG. 2.

As shown in FIGS. 2 and 3, the capacitance Ca includes a coupling capacitance Cc formed by the Sig line (second conductive layer 15) and Vg line (first conductive layer 11) which have the first insulation layer 12 formed between them. The capacitance Ca also includes a coupling capacitance Ct, between the source or drain electrode (second conductive layer 15) of the switching element (TFT) 3 and the gate electrode (first conductive layer 11) of the switching element 3, which is formed by the first insulation layer 12 and the first semiconductor layer 13. That is, the capacitance Ca=Cc+Ct. FIG. 2 shows the regions, having the capacitances Cc and Ct, indicated by hatched portions.

For example, assume that the region with the coupling capacitance Cc has an area of 100 μm², the region with the coupling capacitance Ct has an area of 25 μm², the first insulation layer 12 has a relative dielectric constant of 6 and a thickness of 300 nm, and the first semiconductor layer 13 has a relative dielectric constant of 12 and a thickness of 200 nm.

A coupling capacitance Cs between the Sig line and the lower electrode layer (third conductive layer 17) of the conversion element 2 is given by:

$$Cs = \epsilon_0 \times \epsilon \times S/d$$

where S is the overlapping area of the Sig line and the conversion element 2 in one pixel, d is the thickness of the interlayer insulation film 16, $\epsilon$ is the relative dielectric constant of the interlayer insulation film 16, and $\epsilon_0$ is the vacuum dielectric constant.

When, for example S=950 μm² and $\epsilon$=3, the film thickness d and the capacitances Ca and Cs have relationships as shown in FIG. 4.

As shown in FIG. 4, the capacitance Cs is much larger than the capacitance Ca when the interlayer insulation film 16 has a thickness d of, for example, 500 nm as in the conventional radiographic imaging apparatus. FIG. 4 also reveals that the capacitance Cs largely changes depending on the thickness of the interlayer insulation film 16. Hence, as the thickness of the interlayer insulation film 16 varies within the substrate plane, the sum total Ca+Cs of the parasitic capacitances of the Sig line, in turn, varies. As a consequence, the amount of noise varies within the substrate plane, and this often causes unevenness of an image.

In view of this, the thickness of the interlayer insulation film 16 is preferably set such that the capacitance Cs is equal to or smaller than the capacitance Ca. The thickness of the interlayer insulation film 16 in this embodiment is set to satisfy:

$$Ca \geq \epsilon_0 \times \epsilon \times S/d$$

and that in one conventional example is set to 1.5 μm or more, and this embodiment and the prior arts are significantly different in this respect. That is, even when the thickness of the interlayer insulation film 16 varies within the substrate plane, this embodiment allows the parasitic capacitances of respective Sig lines to be nearly equal to each other, and, in turn, allows reduction in unevenness of an image.

In practice, the thickness of each layer which forms the capacitance Ca may vary by about 10% within the substrate plane, like the capacitance Cs. That is, the capacitance Ca may vary by about 10% within the substrate plane. For this reason, the minimum value of the thickness of the interlayer insulation film 16 is desirably set such that the capacitance Cs is equal to or smaller than the minimum value of the capacitance Ca on the insulating substrate 10.

At the same time, processability needs to be taken into consideration. FIG. 5 is a sectional view of the contact hole 27 and its vicinity. The same reference numerals as in FIG. 3 denote the same parts in FIG. 5. The processability of the contact hole 27 to connect the conversion element 2 and the switching element 3 will be explained with reference to FIG. 5.

As shown in FIG. 5, the layers which constitute the conversion element 2 are formed in the contact hole 27. If the contact hole 27 has a large taper angle, the coverage of the lower electrode (third conductive layer 17) of the conversion element 2 with the second insulation layer 18 is unstable. In this case, the lower electrode (third conductive layer 17) and photoelectric conversion layer (second semiconductor layer 19) of the conversion element 2 may be electrically connected to each other.

To avoid this situation, the contact hole 27 desirably has a shape in which the interlayer insulation film 16 has a taper angle as small as, for example, 45° or less. Particularly when the interlayer insulation film 16 is made of a photosensitive material, the distance (Lf in FIG. 5) from the bottom of the contact hole 27 to its flat surface in the lateral direction (the direction parallel to the substrate plane) is preferably about twice the thickness of the interlayer insulation film 16 or more, that is, about 2d or more.

In addition, to improve the dimensional accuracy of the contact hole 27, it is necessary to ensure a sufficient exposure amount and a sufficient development time to reduce the influences of variations in various factors involved, such as the thickness of the interlayer insulation film 16 and the sensitivity of its material, within the substrate plane and among individual substrates. To meet this need, the diameter (Lb in FIG. 5) of the contact hole 27 at its bottom is preferably about three times the thickness of the interlayer insulation film 16 or more, that is, 3d or more from the viewpoint of ensuring a given dimensional accuracy.

For the above-described reasons, the diameter of the contact hole 27 is preferably about 7d. Furthermore, the Vs line needs to be located at the top of the contact hole 27 as a sensor-specific structure, and is desirably located at the pixel center from the viewpoint of, for example, easy removal of the interconnections on the outside of the pixel region.

Figure 6:
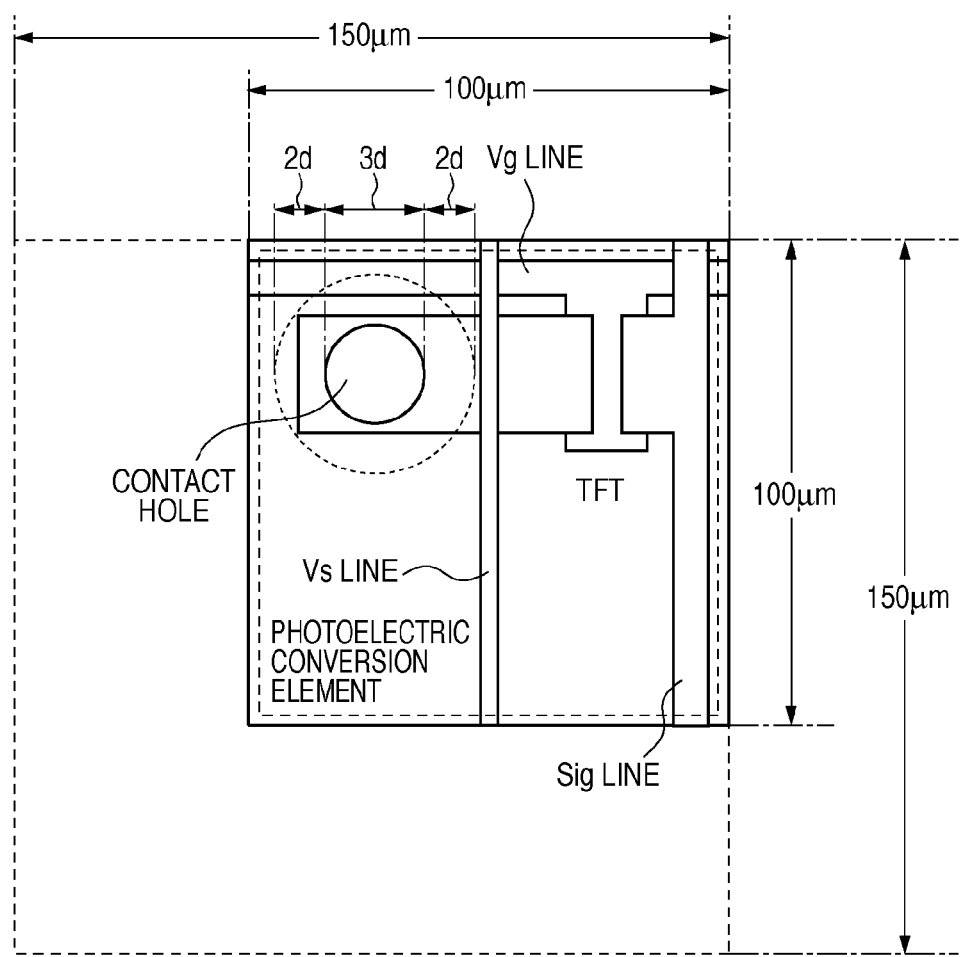
FIG. 6 is a plan view showing one pixel for a pixel size of 100 μm×100 μm.

As shown in FIG. 6, when the pixel pitch is, for example, 100 μm, the switching element (TFT) and the interconnections account for a relatively large area per pixel. Accordingly, the contact hole preferably has a size which falls within at least ½ the pixel pitch. The smaller the pixel pitch, the greater the importance of this feature becomes.

Referring to FIG. 6, when the interlayer insulation film has a thickness of, for example, 6.0 μm, the diameter (indicated by a broken line in FIG. 6) of the contact hole at its top is 7×6.0 μm=42.0 μm. That is, the region in which the contact hole can be formed is practically about half the pixel pitch. It is therefore possible to ensure a given processing stability of the interlayer insulation film 16 by setting its thickness to satisfy:

$$2Lf + Lb = 7d \leq P/2$$

where P is the pixel pitch.

In practice, when the Vs line is located in the contact hole, the resist film thickness (i.e., the thickness of a resist film applied on the object in order to form an etching mask for patterning the Vs line) differs between the internal portion of the contact hole and its external portion (the portion in which the interlayer insulation film is flat) upon forming the Vs line, and the line width of the Vs line, in turn, differs between these portions. It is therefore necessary to locate the Vs line on the flat surface outside the contact hole, and to form a predetermined space between the Vs line and the contact hole from the viewpoint of, for example, preventing any pattern misalignment. As long as the interlayer insulation film has a thickness of about 6.0 μm, as described above, a space can be formed between the Vs line and the contact hole. Referring to FIG. 6, the bias line (Vs line) is located between the switching element (TFT) and the contact hole from the radiation incident side.

From the foregoing, according to this embodiment, it is possible to ensure a given processing stability of the interlayer insulation film in a radiation detection apparatus of the stacked type by setting the thickness of the interlayer insulation film to about 1.5 μm to 6.0 μm. It is also possible to reduce unevenness of an image attributed to variations in the thickness of the interlayer insulation film.

Although FIG. 1 shows 3×3 pixels arrayed in a matrix, 2,000×2,000 pixels, for example, are arrayed in a matrix in practice. Also, although an indirect radiation detection apparatus including a combination of a photoelectric conversion element and a scintillator layer has been shown, the present invention is not limited to this. That is, the same effect can be obtained even when a direct radiation detection apparatus is used in place of a photoelectric conversion element. The direct radiation detection apparatus uses a conversion element in which a semiconductor layer made of, for example, amorphous selenium is disposed between the electrodes and which directly converts particle beams such as X-rays, γ-rays, α-rays, or β-rays into a charge.

Also, a conversion element of an indirect radiation detection panel may be a photoelectric conversion element, other than an MIS type photoelectric conversion element, such as a PIN type photoelectric conversion element. Moreover, although a radiation detection apparatus in which a scintillator layer is stacked on an adhesive layer on a protective layer has been exemplified, one in which a scintillator layer made of, for example, CsI is directly formed on a protective layer is also viable.

A case in which the incident radiation is particle beams such as X-rays, γ-rays, α-rays, or β-rays has been explained above in this embodiment. In contrast, when the incident radiation is visible light or infrared rays, a radiation detection apparatus which includes no scintillator layer and converts the radiation by a photoelectric conversion element is provided instead.

Second Embodiment

Figure 7:
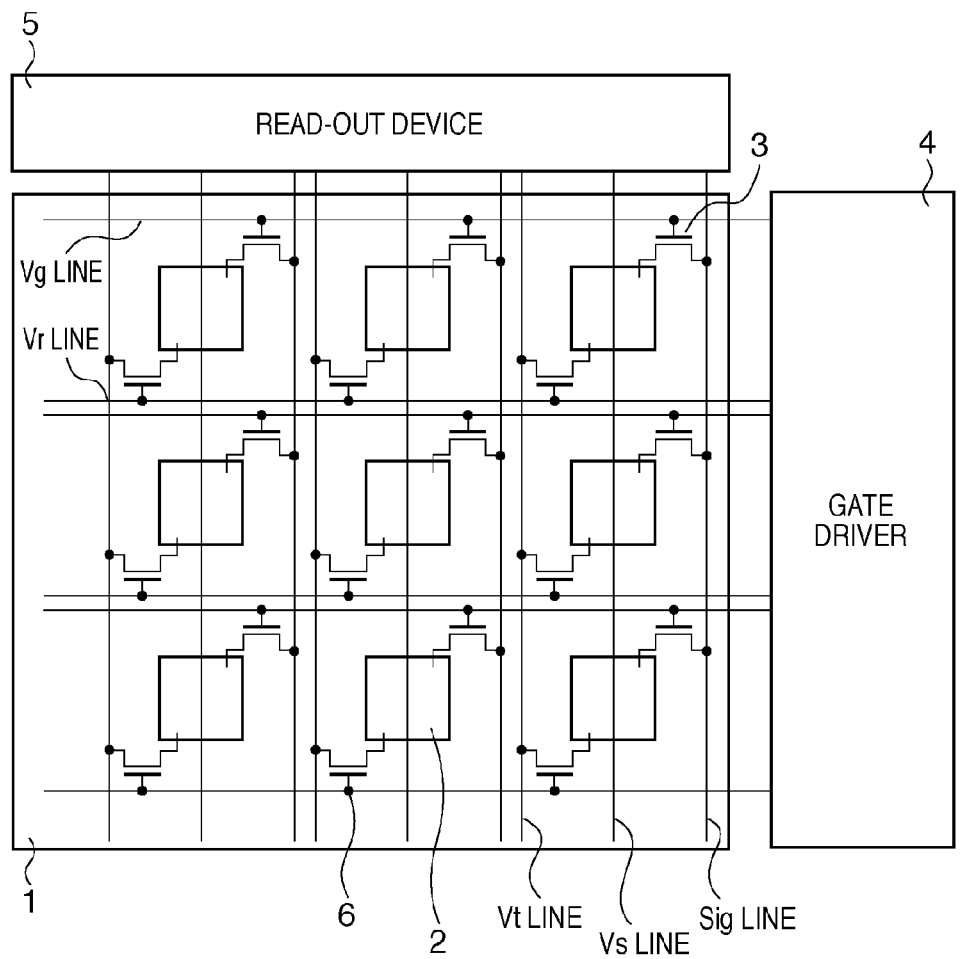
FIG. 7 is a circuit diagram showing the circuitry according to the second embodiment of the present invention.
Figure 8:
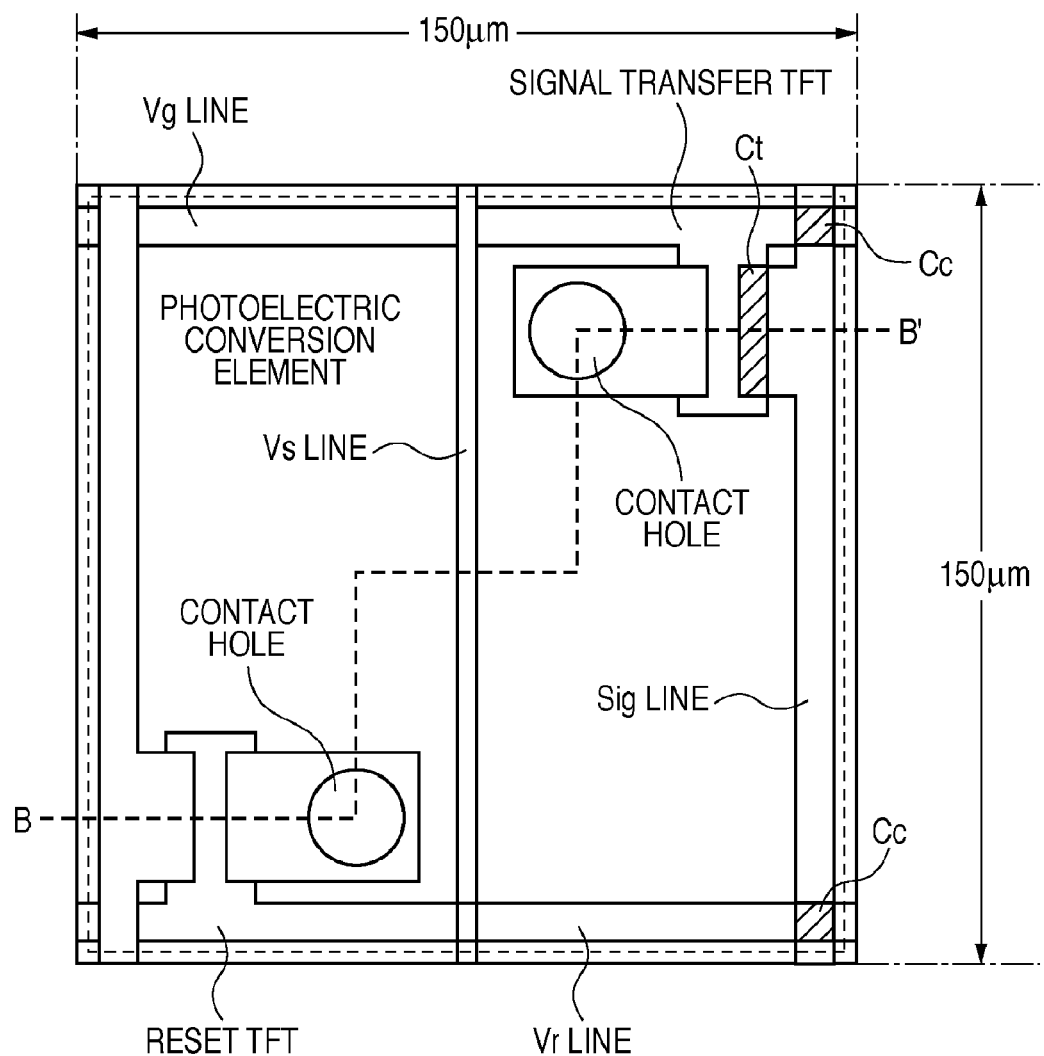
FIG. 8 is a plan view showing one pixel in the second embodiment.
Figure 9:
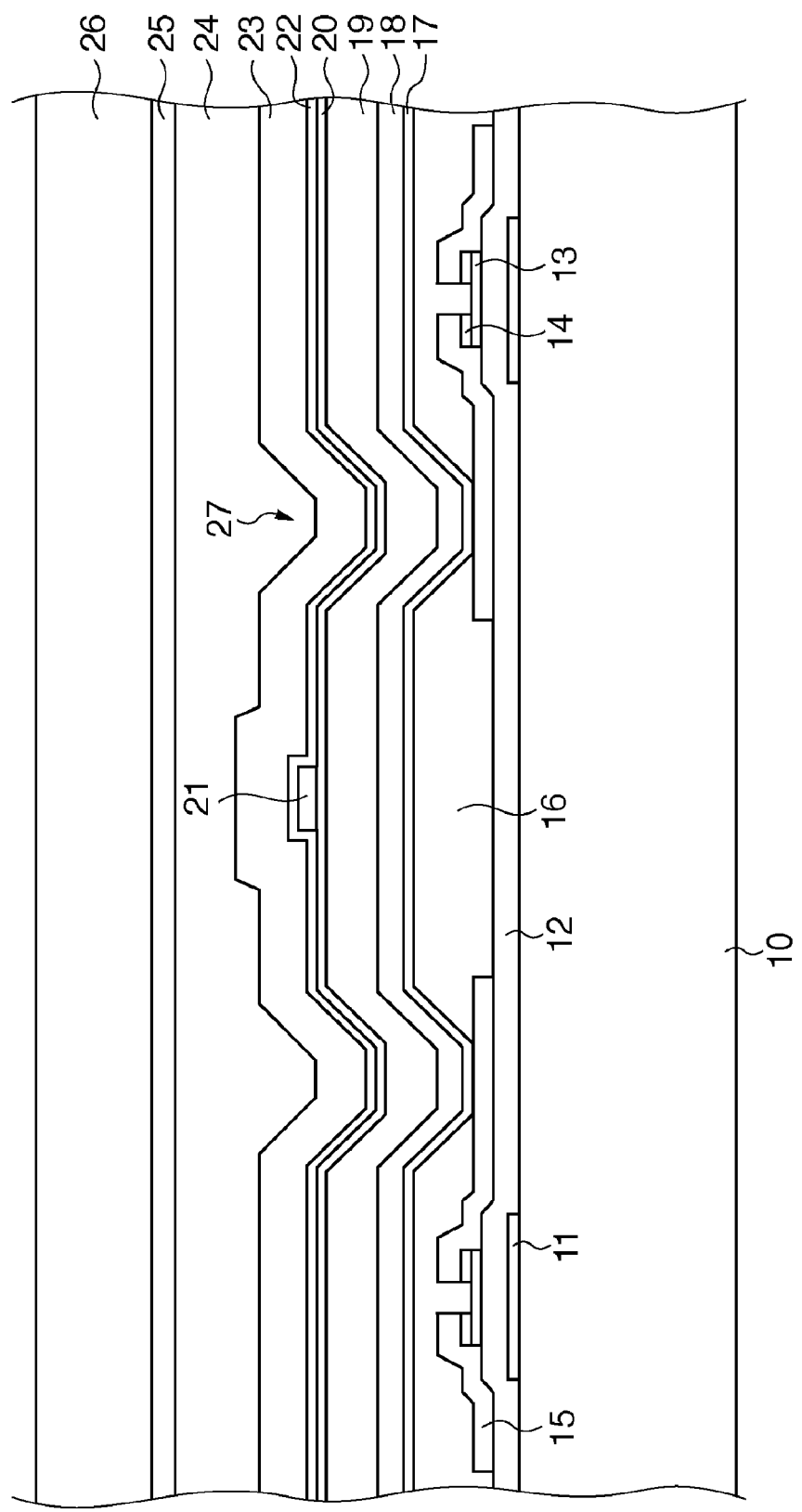
FIG. 9 is a sectional view taken along a line B-B' in FIG. 8.
Figure 10:
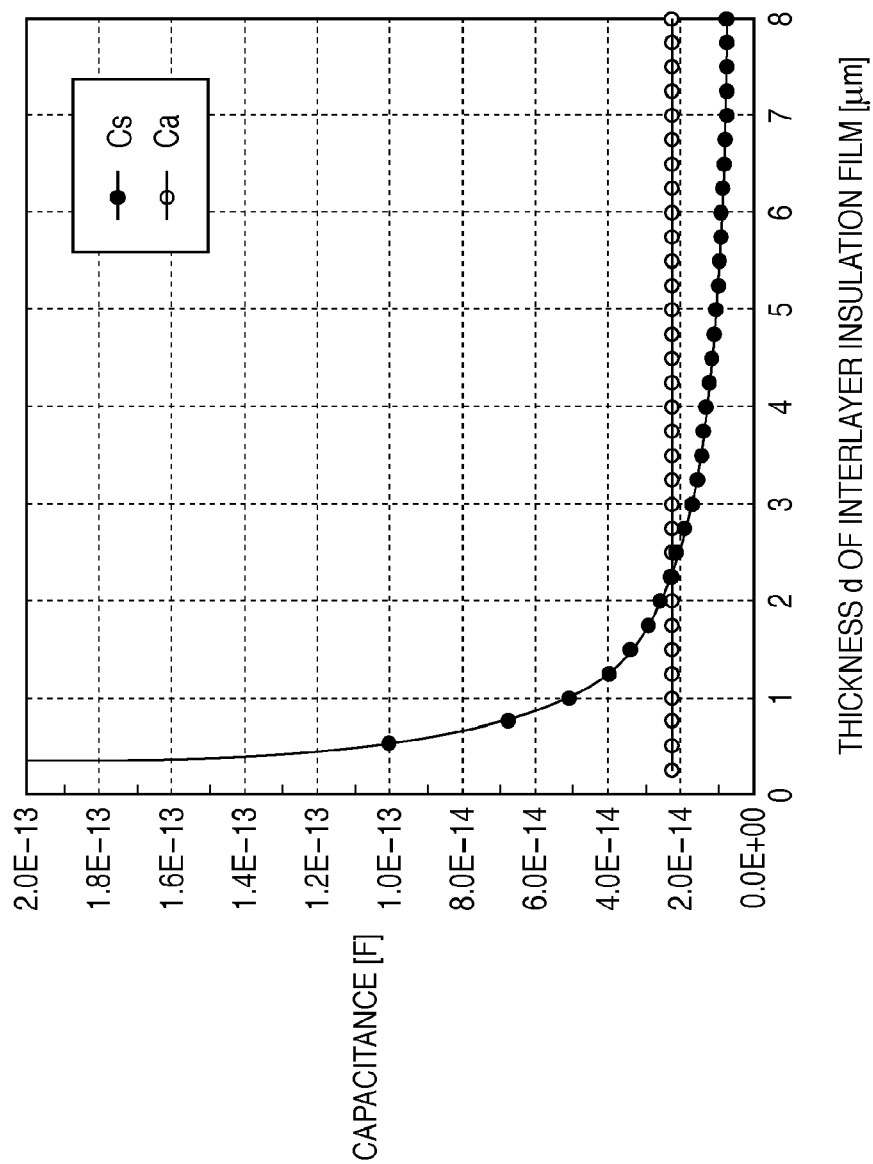
FIG. 10 is a correlation graph showing the relationships between the thickness of an interlayer insulation film and the capacitances added to a signal line in the second embodiment.

The second embodiment of the present invention will be explained next. FIG. 7 is a circuit diagram showing the circuitry according to this embodiment. FIG. 8 is a plan view showing one pixel. FIG. 9 is a sectional view taken along a line B-B' in FIG. 8. FIG. 10 is a correlation graph showing the relationships between the thickness of an interlayer insulation film and the capacitances added to a signal line. The same reference numerals as in FIGS. 1 to 3 denote the same parts in FIGS. 7 to 9.

In this embodiment, one pixel includes a conversion element (photoelectric conversion element) 2, a signal transfer TFT 3 serving as a signal transfer switching element, and a reset TFT 6 serving as a reset switching element. One pixel also includes a gate line (Vr line) and reset line (Vt line) in addition to a bias line (Vs line), gate line (Vg line), and signal line (Sig line).

A plurality of pixels as described above are arrayed in a matrix in a radiation detection panel 1. An MIS type photoelectric conversion element, for example, is used as the conversion element 2. The gate of the signal transfer TFT 3 is connected to a first gate line (Vg line) driven by a gate driver 4, and is driven by the signal from the gate driver 4. The gate of the reset TFT 6 serving as a reset switching element is connected to a second gate line (Vr line) driven by the gate driver 4, and is driven by the signal from the gate driver 4. The reset TFT 6 is used to remove any residual charge of the photoelectric conversion element 2.

The signal transfer TFT 3 has one terminal (a drain or source) connected to the signal line (Sig line). The signal from the conversion element 2 is transferred to the signal line (Sig line) by the signal transfer TFT 3 and read out by a read-out device 5 via the signal line (Sig line). The reset TFT 6 has one terminal (a drain or source) connected to the reset line (Vt line). Any residual charge of the photoelectric conversion element 2 is removed by applying a bias voltage from the reset line (Vt line) to the photoelectric conversion element 2 via the reset TFT 6.

The operation principle will be explained with reference to FIG. 7. First, a bias is applied from the bias line (Vs line) to the conversion element 2 so as to deplete a second semiconductor layer of the MIS type photoelectric conversion element serving as the conversion element 2. In this state, X-rays emitted toward a subject (not shown) are attenuated by and transmitted through the subject and converted into visible light by a scintillator layer (not shown). The obtained visible light enters the conversion element 2 and is converted into a charge by the conversion element 2.

The obtained charge is transferred to the signal line (Sig line) and read out to the outside by the read-out device 5 by turning on the signal transfer TFT serving as a signal transfer switching element by a gate driving pulse applied from the gate driver 4 to the gate line (Vg line). After that, a gate driving pulse is applied from the gate driver 4 to the gate line (Vr line) to turn on the reset TFT 6 serving as a reset switching element.

During this time, a bias to reset the conversion element 2 is applied to the reset line (Vt line) to remove any residual charge which has been generated in the conversion element 2 but remains without being transferred. A pixel signal corresponding to one image is obtained by repeating the foregoing operations. Eventually, a moving image is obtained by repeatedly acquiring image signals each corresponding to one image.

The arrangement of one pixel in this embodiment will be explained with reference to FIG. 8. As shown in FIG. 8, a photoelectric conversion element serving as the conversion element 2, the signal transfer TFT 3 serving as a signal transfer switching element, and the reset TFT 6 serving as a reset switching element are arranged in one pixel. Also, the signal line (Sig line), the gate line (Vg line), the gate line (Vr line), the reset line (Vt line), and the bias line (Vs line) are formed in the pixel. FIG. 8 shows an example in which the pixel pitch is 150 μm, as in FIG. 2.

The layer structure of the radiation detection panel will be explained with reference to FIG. 9. FIG. 9 is a sectional view taken along a line B-B' in FIG. 8. Referring to FIG. 9, reference numeral 10 denotes an insulating substrate. The signal transfer TFT 3 and the reset TFT 6 include a first conductive layer 11, first insulation layer 12, first semiconductor layer 13, first impurity semiconductor layer (ohmic contact layer) 14, and second conductive layer 15.

The first conductive layer 11 is used as the gate electrode of the signal transfer TFT 3, the gate line (Vg line), the gate electrode of the reset TFT 6, and the gate line (Vr line), and the first insulation layer 12 is used as a gate insulation film. The first semiconductor layer 13 is used as the channels of the signal transfer TFT 3 and reset TFT 6. The first impurity semiconductor layer 14 is used as the ohmic contact layer.

The second conductive layer 15 is used as the source or drain electrodes of the signal transfer TFT 3 and reset TFT 6, the signal line (Sig line), and the reset line (Vt line). An interlayer insulation film 16 is formed on the second conductive layer 15, and an MIS type photoelectric conversion element which constitutes the conversion element 2 is stacked on the interlayer insulation film 16.

The conversion element 2 includes a third conductive layer 17, second insulation layer 18, second semiconductor layer (photoelectric conversion layer) 19, second impurity semiconductor layer (hole blocking layer) 20, fourth conductive layer 21, and fifth conductive layer 22.

The third conductive layer 17 is used as the lower electrode of the photoelectric conversion element 2, and the second insulation layer 18 is used as an insulation layer of the photoelectric conversion element 2. The second semiconductor layer 19 is used as a photoelectric conversion layer of the photoelectric conversion element 2, and the second impurity semiconductor layer 20 is used as a hole blocking layer of the photoelectric conversion element 2.

The fourth conductive layer 21 is used as the Vs line or the upper electrode of the photoelectric conversion element 2, and the fifth conductive layer 22 is used as an electrode for applying a bias voltage supplied from the Vs line to the entire photoelectric conversion element 2. A third insulation layer 23, a protective layer 24, an adhesive layer 25, and a scintillator layer (phosphor layer) 26 for converting X-rays into visible light by wavelength conversion are sequentially formed on the fifth conductive layer 22.

The parasitic capacitance of the signal line (Sig line) will be explained hereinafter. Let Ca be the sum total of the coupling capacitances between the Sig line and the first conductive layer 11 in one pixel. Note that the capacitance Ca includes a coupling capacitance Cc formed by the Sig line (second conductive layer 15) and Vg line (first conductive layer 11) which have the first insulation layer 12 formed between them, as shown in FIGS. 8 and 9.

The capacitance Ca also includes a coupling capacitance Cc formed by the Sig line (second conductive layer 15) and Vr line (first conductive layer 11) which have the first insulation layer 12 formed between them. The capacitance Ca also includes a coupling capacitance Ct, between the source or drain electrode (second conductive layer 15) of the TFT (signal transfer TFT 3) and the gate electrode (first conductive layer 11) of the TFT, which is formed by the first insulation layer 12 and the first semiconductor layer 13. That is, Ca=2×Cc+Ct. FIG. 8 shows the regions, having the capacitances Cc and Ct, indicated by hatched portions.

As in the first embodiment, a coupling capacitance Cs between the Sig line and the lower electrode layer (third conductive layer 17) of the photoelectric conversion element 2 is given by:

$$Cs = \epsilon_0 \times \epsilon \times S/d$$

where $\epsilon$ is the relative dielectric constant of the interlayer insulation film 16, and $\epsilon_0$ is the vacuum dielectric constant.

Note that $\epsilon=6$ when the interlayer insulation film 16 is made of the same material as the first insulation layer 12. In addition, when the area of each unit and the thickness and relative dielectric constant of each layer are assumed to be the same as in the first embodiment, the film thickness d and the capacitances Ca and Cs have relationships as shown in FIG. 10.

As shown in FIG. 10, the capacitance Cs is much larger than the capacitance Ca when the interlayer insulation film 16 has a thickness d of, for example, 500 nm as in the conventional radiographic imaging apparatus. FIG. 10 also reveals that the capacitance Cs largely changes depending on the thickness of the interlayer insulation film 16. Hence, as the thickness of the interlayer insulation film 16 varies within the substrate plane, the sum total Ca+Cs of the parasitic capacitances of the Sig line, in turn, varies. As a consequence, the amount of noise varies within the substrate plane, and this often causes unevenness of an image in the conventional radiographic imaging apparatus.

In view of this, the thickness of the interlayer insulation film 16 is preferably set such that the capacitance Cs is equal to or smaller than the capacitance Ca, as in the first embodiment. The thickness of the interlayer insulation film 16 in this embodiment is set to satisfy:

$$Ca \geq \epsilon_0 \times \epsilon \times S/d$$

and that in one conventional example is set to 2.5 μm or more, and this embodiment and the prior arts are significantly different in this respect. That is, even when the thickness of the interlayer insulation film 16 varies within the substrate plane, this embodiment allows the parasitic capacitances of respective Sig lines to be nearly equal to each other, and, in turn, allows reduction in unevenness of an image.

As in the first embodiment, it is possible to ensure a given processing stability of the interlayer insulation film 16 by setting its thickness to satisfy:

$$2Lf + Lb = 7d \leq P/2$$

From the foregoing, when the pixel pitch is assumed to be as large as about 100 μm, it is possible to ensure a given processing stability of the interlayer insulation film in a radiation detection apparatus of the stacked type by setting the thickness of the interlayer insulation film to about 2.5 μm to 6.0 μm. It is also possible to reduce unevenness of an image attributed to variations in the thickness of the interlayer insulation film. Naturally, when the pixel pitch is smaller than 100 μm, the thickness of the interlayer insulation film needs to be set smaller than 6.0 μm.

Although FIG. 7 shows 3×3 pixels arrayed, 2,000×2,000 pixels, for example, are arrayed in practice. Also, although an indirect radiation detection apparatus including a combination of a photoelectric conversion element and a scintillator layer has been shown, the present invention is not limited to this. That is, the same effect can be obtained even when a direct radiation detection apparatus is used in place of a photoelectric conversion element. The direct radiation detection apparatus uses a conversion element in which a semiconductor layer made of, for example, amorphous selenium is disposed between the electrodes and which directly converts particle beams such as X-rays, γ-rays, α-rays, or β-rays into a charge.

Also, a conversion element of an indirect radiation detection panel may be a photoelectric conversion element, other than an MIS type photoelectric conversion element, such as a PIN type photoelectric conversion element. Moreover, although a radiation detection apparatus in which a scintillator layer is stacked on an adhesive layer on a protective layer has been exemplified, one in which a scintillator layer made of, for example, CsI is directly formed on a protective layer is also viable. A case in which the incident radiation is particle beams such as X-rays, γ-rays, α-rays, or β-rays has been explained above in the above-described embodiments. In contrast, when the incident radiation is visible light or infrared rays, a radiation detection apparatus which includes no scintillator layer and converts the radiation by a photoelectric conversion element is provided instead.

Third Embodiment

Figure 11:
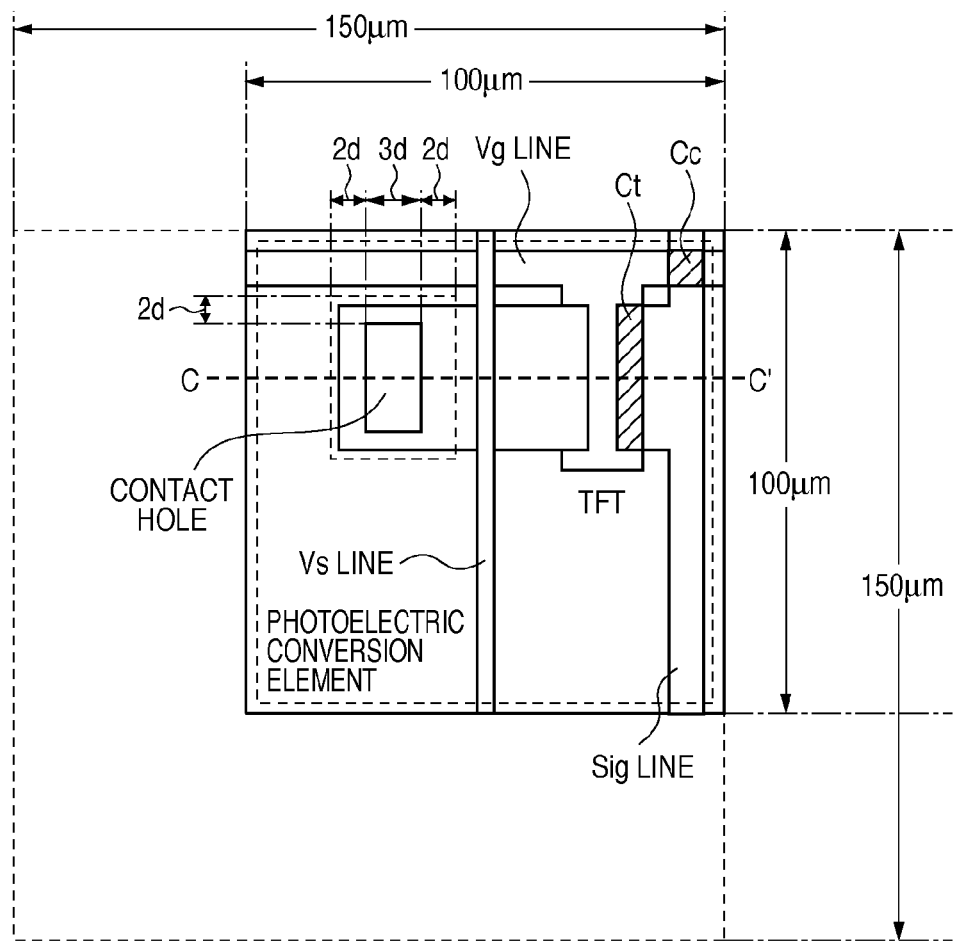
FIG. 11 is a plan view showing one pixel in the third embodiment.
Figure 12:
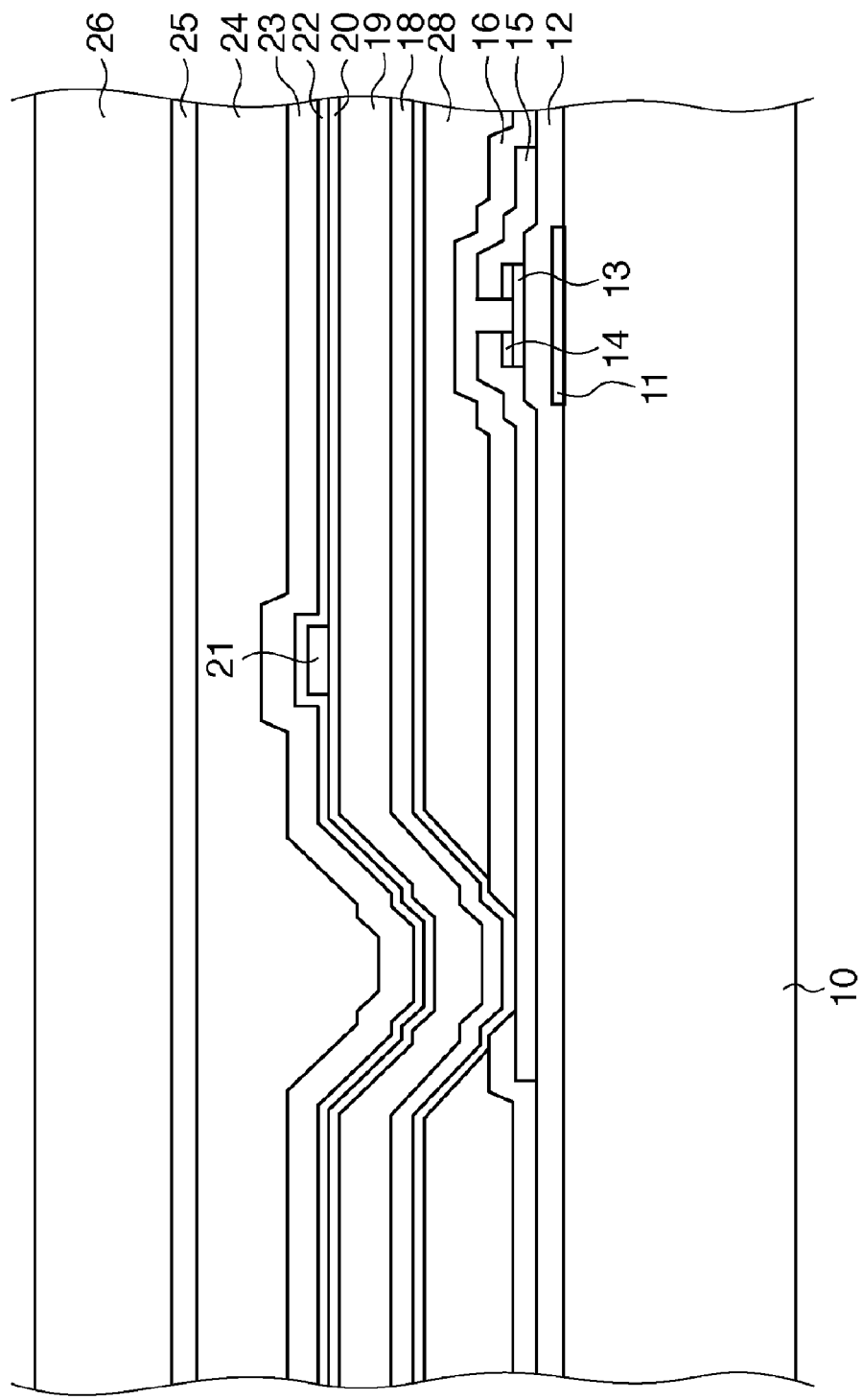
FIG. 12 is a sectional view taken along a line C-C' in FIG. 11.

The third embodiment of the present invention will be explained next. FIG. 11 is a plan view showing one pixel. FIG. 12 is a sectional view taken along a line C-C' in FIG. 11. The same reference numerals as in FIGS. 1 to 3 denote the same parts in FIGS. 11 and 12.

The arrangement of one pixel will be explained with reference to FIG. 11. A photoelectric conversion element serving as a conversion element 2, and a TFT serving as a switching element 3 are arranged in one pixel of a radiation detection panel, as in the first embodiment. Also, an Sig line, a Vg line, and a Vs line are formed in one pixel. The third embodiment is different from the first embodiment in that a contact hole to connect the photoelectric conversion element and the TFT has a rectangular or elliptical shape.

The arrangement of one pixel in this embodiment will be explained with reference to FIG. 12. FIG. 12 is a sectional view taken along a line C-C' in FIG. 11. Referring to FIG. 12, reference numeral 10 denotes an insulating substrate. A TFT serving as the signal transfer switching element 3 is formed on the insulating substrate 10. A first interlayer insulation film 16 and a second interlayer insulation film 28 are formed on a second conductive layer 15 which forms the Sig line and the source or drain electrode of the TFT. The third embodiment is different from the first embodiment in that these two types of interlayer insulation films are formed. More specifically, a film having a relative dielectric constant $\in=6$ as in a first insulation layer 12 is used as the first interlayer insulation film 16, and that having a relative dielectric constant $\in=3$ is used as the second interlayer insulation film 28. Moreover, an MIS type photoelectric conversion element which constitutes the conversion element 2 is stacked on the second interlayer insulation film 28.

The parasitic capacitance of the signal line (Sig line) will be explained hereinafter. Let Ca be the sum total of the coupling capacitances between the Sig line (second conductive layer 15) and a first conductive layer 11 in one pixel, as shown in FIG. 11. Note that the capacitance Ca includes a coupling capacitance Cc formed by the Sig line (second conductive layer 15) and Vg line (first conductive layer 11) which have the first insulation layer 12 formed between them, as shown in FIGS. 11 and 12. The capacitance Ca is the sum total of the coupling capacitance Cc and a coupling capacitance Ct, between the source or drain electrode (second conductive layer 15) of the TFT and the gate electrode (first conductive layer 11) of the TFT, which is formed by the first insulation layer 12 and a first semiconductor layer 13. That is, the capacitance Ca=Cc+Ct. FIG. 11 shows the regions, having the capacitances Cc and Ct, indicated by hatched portions.

Let $C_{16}$ be the capacitance of the first interlayer insulation film 16, and $C_{28}$ be the capacitance of the second interlayer insulation film 28 in the portion in which the Sig line and the conversion element 2 overlap each other in one pixel. Then, a coupling capacitance Cs between the Sig line and the lower electrode layer (third conductive layer 17) of the conversion element 2 is given by:

$$Cs=(C_{16} \times C_{28})/(C_{16}+C_{28})$$

As described above, as the thickness of the first interlayer insulation film 16 or second interlayer insulation film 28 varies within the substrate plane, the sum total Ca+Cs of the parasitic capacitances of the Sig lines, in turn, varies. As a consequence, the amount of noise varies within the substrate plane, and this often causes unevenness of an image.

In view of this, the thicknesses of the first interlayer insulation film 16 and second interlayer insulation film 28 are preferably set such that the capacitance Cs is equal to or smaller than the capacitance Ca, as in the first and second embodiments. The thicknesses of the first interlayer insulation film 16 and second interlayer insulation film 28 in this embodiment are set to satisfy:

$$Ca \geq (C_{16} \times C_{28})/(C_{16}+C_{28})$$

That is, even when the thickness of the first interlayer insulation film 16 or second interlayer insulation film 28 varies within the substrate plane, this embodiment allows the parasitic capacitances of respective Sig lines to be nearly equal to each other, and, in turn, allows reduction in unevenness of an image.

If three or more interlayer insulation films are formed, their thicknesses are desirably set to satisfy $Ca \geq Cs$ in the same manner as above.

The contact hole is desirably processed to have a shape with a taper angle as small as, for example, 45° or less, as has been described in the first embodiment. In this embodiment, since the second interlayer insulation film 28 has photosensitivity, the distance (Lf in FIG. 5) from the bottom of the contact hole to its flat surface in the lateral direction is preferably about $2d_{28}$ or more, where $d_{28}$ is the thickness of the second interlayer insulation film 28.

The Sig line and the Vg line form capacitances with the conversion element 2 through the first interlayer insulation film 16 and the second interlayer insulation film 28. For this reason, the thicknesses of the interlayer insulation films on each interconnection located under them are desirably constant in order to maintain the capacitance of each interconnection constant. That is, the intervals between the contact hole and the Sig line and Vg line are desirably $2d_{28}$ or more.

As has been described in the first embodiment, interconnections to be located above the contact hole and, particularly, the Vs line need to be located on the flat surface outside the contact hole from the viewpoint of ensuring a given stability of the processing accuracy. That is, the interval between the Vs line and the contact hole is desirably $2d_{28}$ or more. When the pixel pitch is relatively small, a sufficient interval can be secured between the Sig line and the Vs line by locating the Vs line between the contact hole and the Sig line, as shown in FIG. 11.

When the contact hole has a rectangular or elliptical shape as in this embodiment, the diameter (Lb in FIG. 5) of the contact hole at its bottom need only be $3d_{28}$ or more on the short side of the contact hole, as in FIG. 11. That is, as in the first and second embodiments, it is possible to ensure a given stability of the processing accuracy of the second interlayer insulation film 28 by setting its thickness to satisfy:

$$2Lf+Lb=d_{28} \leq P/2$$

Fourth Embodiment

Figure 13:
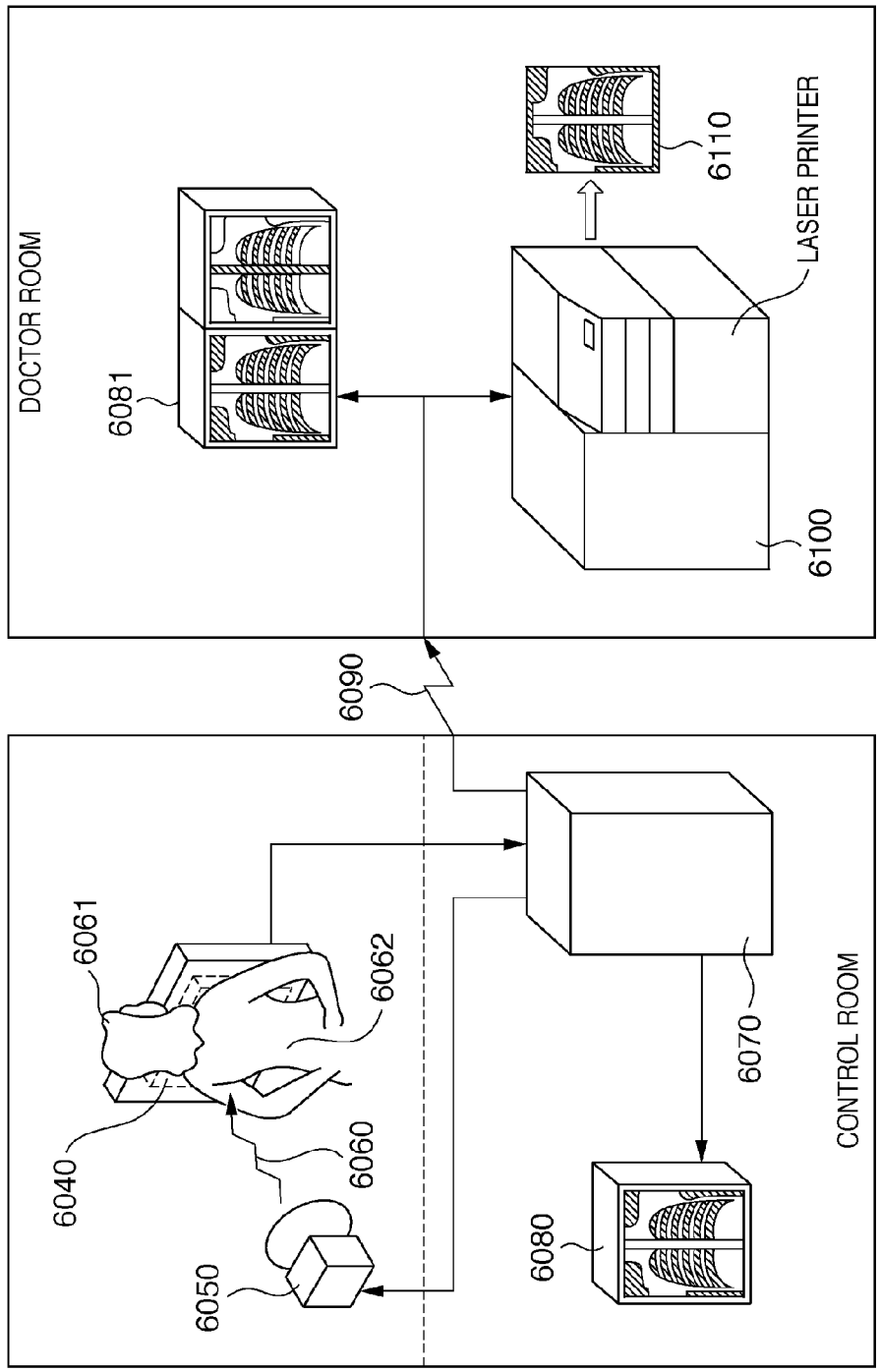
FIG. 13 is a view showing the configuration of a radiographic imaging system in one embodiment, which uses the radiation detection apparatus according to the present invention.

FIG. 13 is a view showing the configuration of a radiographic imaging system in one embodiment, which uses the radiation detection apparatus according to the present invention. Although radiation in this embodiment means X-rays, α-rays, β-rays, and γ-rays, X-rays will be typically taken as an example. X-rays 6060 emitted by an X-ray tube 6050 serving as a radiation source are transmitted through a chest 6062 of a patient or subject 6061, and enter a radiation detection apparatus 6040 including a scintillator, as shown in FIG. 13.

The incident X-rays bear the information of the interior of the body of the subject 6061. The scintillator emits light in response to the X-ray incidence, and photoelectrically converts the X-rays to obtain electrical information. The obtained information is converted into a digital image, is processed by an image processor 6070 serving as a signal processing unit for processing the signal from the radiation detection apparatus 6040, and can be observed by a display 6080 serving as a display unit in a control room.

The obtained information can be transferred to a remote site by a transmission processing unit such as a telephone line 6090, be displayed on a display 6081 serving as a display unit installed in, for example, a doctor room in another site or saved in a recording unit such as an optical disk, and be used to diagnose the chest 6062 by a doctor in the remote site. The obtained information can also be recorded on a film 6110 serving as a recording medium by a film processor 6100 serving as a recording unit.

The radiographic imaging system according to the present invention may include the radiation detection apparatus 6040 and one or two or more of the following unit. That is, the radiographic imaging system may include one or two or more of the signal processing unit (the image processor 6070), the recording unit (e.g., the film processor 6100), the display unit (the display 6080), the transmission processing unit (e.g., the telephone line 6090), and the radiation source (the X-ray tube 6050).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-172622, filed Jul. 1, 2008 and 2009-136710, filed Jun. 5, 2009, which are hereby incorporated by reference herein in their entirety.

What is claimed is:

1. A radiation detection apparatus comprising
a plurality of pixels each including a conversion element which converts incident radiation into a charge, a switching element which transfers the charge of the conversion element;
a gate line connected to a gate of the switching element; and
a signal line which is located to intersect with the gate line and connected to a source or drain of the switching element; and
an interlayer insulation film disposed between the conversion element and the switching element and disposed between the conversion element and the signal line,
wherein $Cc+Ct \geq \in_0 \times \in \times S/d$ is satisfied, where Cc is a coupling capacitance between the signal line and the gate line in one pixel, Ct is a coupling capacitance between the gate of the switching element and the source or drain of the switching element in one pixel, S is an overlapping area of the signal line and the conversion element in one pixel, d is a thickness of the interlayer insulation film, $\in$ is a relative dielectric constant of the interlayer insulation film, and $\in_0$ is a vacuum dielectric constant.

2. The apparatus according to claim 1, wherein $7d \leq P/2$ is satisfied, where P is a pixel pitch of the plurality of pixels, and wherein a taper angle of a contact hole of the interlayer insulation film, which is provided to electrically connect the conversion element and the switching element, is not more than 45°.

3. The apparatus according to claim 1, further comprising
a bias line configured to apply a bias voltage to the conversion element,
wherein the bias line is located between the switching element and a contact hole of the interlayer insulation film, which is provided to electrically connect the conversion element and the switching element, when viewed from a radiation incident side.

4. The apparatus according to claim 1, wherein the conversion element includes a photoelectric conversion element, on which a scintillator layer is formed.

5. A radiation detection apparatus comprising
a plurality of pixels each including a conversion element which converts incident radiation into a charge, a transfer switching element which transfers the charge of the conversion element, a reset switching element which applies a bias voltage to reset the conversion element to the conversion element;
a first gate line connected to a gate of the transfer switching element;
a second gate line connected to a gate of the reset switching element; and
a signal line which is located to intersect with the first gate line and the second gate line and connected to a source or drain of the transfer switching element; and
an interlayer insulation film disposed between the conversion element and the transfer switching element and disposed between the conversion element and the signal line,
wherein $2 \times Cc+Ct \geq \in_0 \times \in \times S/d$ is satisfied, where Cc is a coupling capacitance between the signal line and the first gate line and a coupling capacitance between the signal line and the second gate line in one pixel, Ct is a coupling capacitance between the gate of the switching element and the source or drain of the switching element in one pixel, S is an overlapping area of the signal line and the conversion element in one pixel, d is a thickness of the interlayer insulation film, $\in$ is a relative dielectric constant of the interlayer insulation film, and $\in_0$ is a vacuum dielectric constant.

6. A radiographic imaging system comprising:
a radiation detection apparatus defined in claim 1; and
a signal processor configured to process the signal from said radiation detection apparatus.

7. A radiographic imaging system comprising:
a radiation detection apparatus defined in claim 5; and
a signal processor configured to process the signal from said radiation detection apparatus.

* * * * *